United States Patent
Feuillat et al.

[15] 3,644,006
[45] Feb. 22, 1972

[54] CAGES FOR ROLLER-BEARINGS

[72] Inventors: Pierre Feuillat; Joseph Lyard, both of Annecy, France

[73] Assignee: Societe Nouvelle de Roulements, Annecy (Haute Savoie), France

[22] Filed: Nov. 18, 1969

[21] Appl. No.: 877,782

[30] Foreign Application Priority Data
 Nov. 20, 1968 France....................................174606

[52] U.S. Cl..........................................................308/213
[51] Int. Cl. ..........................................................F16c 19/26
[58] Field of Search...........................308/201, 212, 217, 213

[56] References Cited
 UNITED STATES PATENTS
 3,205,029  9/1965  Greby....................308/217
 3,144,284  8/1964  Ortegren................308/217

*Primary Examiner*—Edgar W. Geoghegan
*Assistant Examiner*—Frank Susko
*Attorney*—Stevens, Davis, Miller & Mosher

[57] ABSTRACT

This cage, separator or retainer for roller-bearings consists of a one-piece envelope and the rollers are retained, in the absence of one of the bearing races, by bosses formed in said cage and engaging adequate cavities centered at each end of the rollers.

1 Claims, 6 Drawing Figures

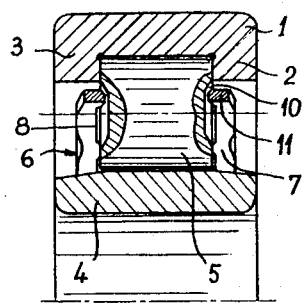
Fig. 1
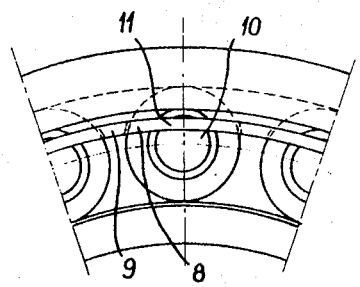
Fig. 2
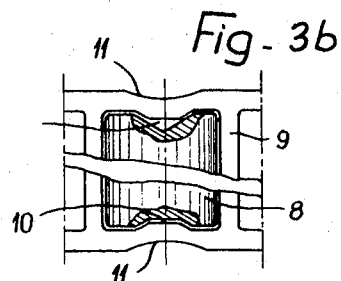
Fig. 3b
Fig. 3a
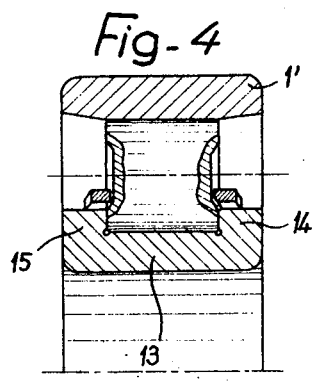
Fig. 4
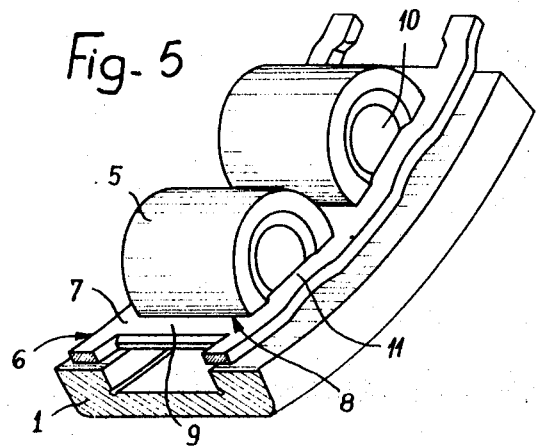
Fig. 5

CAGES FOR ROLLER-BEARINGS

This invention relates to cages, retainers or separators for roller-bearings.

Roller-bearings are characterized by the known drawback that the rollers therein can move radially in their cage when one of the races is still to be fitted to the bearing, thus making the fitting of this race a particularly difficult operation.

It is the object of the present invention to provide a cage, retainer or separator for roller-bearing whereby the above-mentioned inconvenience is avoided. This cage consisting of an envelope of cylindrical configuration, without flanges, comprises rectangular apertures permitting the passage of the rollers in rolling contact with the inner and outer races, and is characterized in that the rollers are held in proper relation to the race, i.e., before the second race is fitted to the assembly, by bosses formed by pressing the cage in a transverse direction, these bosses engaging adequate cavities formed centrally of or concentrically to each roller end face.

This type of one-piece cage eliminates the drawbacks characterizing hitherto known multiple-element cages or retainers (such as the risk of disassembling during the bearing operation). Furthermore, the cage of this invention is considerably lighter in weight, given an equal mechanical strength.

On the other hand, the manufacture of the cages or retainers according to this invention is much simpler and economical than that of conventional cages, from the dual point of view of material and their assembling operation.

A clearer understanding of this invention will be obtained as the following description proceeds with reference to the attached diagrammatic drawings illustrating by way of example two typical forms of embodiment of the invention. In the drawings:

FIG. 1 is a fragmentary radial section taken across a roller-bearing comprising two lips on its outer race;

FIG. 2 is a fragmentary axial view of the roller-bearing of FIG. 1;

FIGS. 3a and 3b are comparative fragmentary sections of rollers having different cavities, the sections being taken along a plane tangent to the cage;

FIG. 4 illustrates in fragmentary radial section a roller-bearing comprising two fixed lips on the inner race;

FIG. 5 illustrates in fragmentary perspective view one portion of a roller-bearing to show the relative arrangement of the component elements of the bearing of FIG. 1, the inner race being removed for the sake of clarity.

Referring first to FIGS. 1 and 2, it will be seen that an outer race 1 formed with a pair of fixed lips 2 and 3, and an inner race 4, comprises cylindrical rollers 5 disposed between the two races and separated by a cage or retainer 6 consisting of a cylindrical one-piece envelope or stamping 7 formed with spaced rectangular apertures or cells 8 adapted to permit the passage of rollers 5 and separated by distance-pieces 9. Each roller has formed in its end faces a concentric cavity 10 of frustoconical configuration, adapted to receive a stamped element or boss 11 of the cage 6 which is preferably eccentric in regard to the pitch circle containing the roller axes.

This element or boss 11 may also be obtained by appropriately cutting the aperture 8, or by any other means capable of producing the same result.

FIGS. 3a and 3b illustrate in section taken along a plane tangent to the cage and perpendicular to the radial plane containing the roller axis the frustoconical configuration 10 (FIG. 3a) and the conical configuration 12 (FIG. 3b) of the cavities formed in the end face of rollers 5.

FIG. 4 illustrates a roller-bearing comprising the same cage as in FIG. 1, the inner race 13 being formed with a pair of fixed lips 14 and 15.

FIG. 5 is a fragmentary perspective view showing a roller-bearing equipped with the roller cage shown in FIG. 1, the inner race being omitted to afford a clearer understanding of the arrangement.

Of course, various modifications and variations may be applied to the specific forms of embodiment of the present invention which are shown and described herein, without departing from the spirit and scope of the invention as set forth in the appended claims.

We claim:

1. In a roller-bearing having assembled inner and outer circled races one of which is flanged and a plurality of cylindrical rollers fitted in parallel with the axes of said races and in rolling contact with the races said rollers having concentric cavities in their end faces, a cage comprising a one-piece, relatively thin, lightweight, hollow, flangeless, cylindrical envelope having a plurality of spaced rectangular apertures formed therein for the passage of said rollers, and said envelope having inwardly directed bosses projecting into said apertures and engaging said cavities in the rollers, said cage being eccentrically mounted out of the pitch circle containing the roller axes, and said bosses being formed in a direction parallel to the axes of said races in order to retain the rollers in proper position with the flanged race when only one of the bearing races is fitted in the bearing assembly.

* * * * *